US010055440B2

United States Patent
Bensberg et al.

(10) Patent No.: US 10,055,440 B2
(45) Date of Patent: Aug. 21, 2018

(54) DATABASE TABLE RE-PARTITIONING USING TRIGGER-BASED CAPTURE AND REPLAY

(71) Applicants: Christian Bensberg, Heidelberg (DE); Franz Faerber, Walldorf (DE); Lars Fricke, Karlsruhe (DE); Juchang Lee, Seoul (KR); Roland Sedler, Leimen (DE); Andreas Tonder, Weinheim (DE); Emanuel Ziegler, Heidelberg (DE)

(72) Inventors: Christian Bensberg, Heidelberg (DE); Franz Faerber, Walldorf (DE); Lars Fricke, Karlsruhe (DE); Juchang Lee, Seoul (KR); Roland Sedler, Leimen (DE); Andreas Tonder, Weinheim (DE); Emanuel Ziegler, Heidelberg (DE)

(73) Assignee: SAP SE, Walldorf (DE)

( * ) Notice: Subject to any disclaimer, the term of this patent is extended or adjusted under 35 U.S.C. 154(b) by 452 days.

(21) Appl. No.: 14/188,543

(22) Filed: Feb. 24, 2014

(65) Prior Publication Data
US 2015/0242400 A1 Aug. 27, 2015

(51) Int. Cl.
*G06F 17/30* (2006.01)
(52) U.S. Cl.
CPC ................. *G06F 17/30339* (2013.01)
(58) Field of Classification Search
CPC .................................................. G06F 17/3051
USPC ........................................................ 707/615
See application file for complete search history.

(56) References Cited

U.S. PATENT DOCUMENTS

| 6,122,640 | A  | * | 9/2000  | Pereira ............. G06F 17/30339 707/648 |
| 6,484,181 | B2 | * | 11/2002 | Attaluri ............ G06F 17/30595 |
| 6,732,122 | B2 | * | 5/2004  | Zoltan ................ G06F 11/2082 370/324 |
| 6,820,095 | B1 | * | 11/2004 | Yeung ............... G06F 17/30306 707/642 |
| 6,965,899 | B1 | * | 11/2005 | Subramaniam ... G06F 17/30339 |
| 7,143,105 | B2 | * | 11/2006 | Nakano ............ G06F 17/30339 |
| 7,203,712 | B2 | * | 4/2007  | Adiba ............... G06F 17/30318 |
| 7,240,054 | B2 | * | 7/2007  | Adiba ............... G06F 17/30371 |
| 7,490,084 | B2 | * | 2/2009  | Kothuri ............ G06F 17/30327 |

(Continued)

FOREIGN PATENT DOCUMENTS

| EP | 2660732 A1 | 6/2013 |
| EP | 2660734 A1 | 6/2013 |

*Primary Examiner* — Miranda Le
(74) *Attorney, Agent, or Firm* — Mintz Levin Cohn Ferris Glovsky and Popeo, P.C.

(57) ABSTRACT

Partitioning of a source table of a database to a target table is initiated. Thereafter, a replay table is generated that is populated with triggers for database operations performed on the source table for subsequent replay for the target partitions. Data is later moved (e.g., asynchronously moved, etc.) from the source table to the target table. The database operations are replayed on the target table T subsequent to the moving of the data using the replay table. In addition, the source table is dropped when all of the data has been moved to the target table and there are no operations requiring replay. Related apparatus, systems, techniques and articles are also described.

14 Claims, 6 Drawing Sheets

(56) References Cited

U.S. PATENT DOCUMENTS

| | | | |
|---|---|---|---|
| 7,702,658 B2* | 4/2010 | Dunn | G06F 17/30377 707/999.201 |
| 7,912,819 B2* | 3/2011 | He | G06F 17/30309 707/695 |
| 8,078,825 B2* | 12/2011 | Oreland | G06F 17/30336 711/114 |
| 8,126,870 B2 | 2/2012 | Chowdhuri et al. | |
| 8,195,606 B2* | 6/2012 | Lu | G06F 17/3038 707/610 |
| 8,209,294 B2 | 6/2012 | Shankar et al. | |
| 8,275,761 B2* | 9/2012 | Day | G06F 17/30442 707/713 |
| 8,347,204 B2* | 1/2013 | Rosner | G06F 17/30498 715/212 |
| 8,515,945 B2 | 8/2013 | Pendap et al. | |
| 8,554,726 B2* | 10/2013 | Frantz | G06F 17/30306 707/613 |
| 8,572,091 B1 | 10/2013 | Sivasubramanian et al. | |
| 8,595,267 B2* | 11/2013 | Sivasubramanian | G06F 9/5061 707/803 |
| 8,606,744 B1* | 12/2013 | Dageville | G06F 17/3038 707/602 |
| 8,615,503 B2* | 12/2013 | Adyilamuriyil | G06F 17/30584 707/703 |
| 8,620,888 B2* | 12/2013 | Basu | G06F 17/30595 707/705 |
| 8,732,517 B1* | 5/2014 | Stefani | G06F 17/30584 707/610 |
| 8,805,784 B2* | 8/2014 | Novik | G06F 17/30566 707/633 |
| 9,177,004 B2* | 11/2015 | Bright | G06F 17/30306 |
| 9,268,804 B2* | 2/2016 | Bhattacharjee | G06F 17/30309 |
| 9,323,798 B2* | 4/2016 | Konik | G06F 17/30345 |
| 9,348,883 B2* | 5/2016 | Gale | G06F 17/30578 |
| 9,477,741 B2* | 10/2016 | Frantz | G06F 17/30306 |
| 9,507,818 B1* | 11/2016 | Stefani | G06F 17/30002 |
| 9,542,424 B2* | 1/2017 | Plattner | G06F 17/30312 |
| 2006/0200499 A1* | 9/2006 | Bhatia | G06F 17/30917 |
| 2007/0100791 A1* | 5/2007 | Lakshminarasimhan | G06F 17/3051 |
| 2009/0019057 A1* | 1/2009 | Hayashi | G06F 17/3087 |
| 2009/0083341 A1* | 3/2009 | Parees | G06F 17/30371 |
| 2009/0319581 A1* | 12/2009 | Seifert | G06F 17/30312 |
| 2010/0161569 A1 | 6/2010 | Schreter | |
| 2011/0153593 A1 | 6/2011 | Zhou et al. | |
| 2011/0161379 A1 | 6/2011 | Plattner et al. | |
| 2011/0225122 A1* | 9/2011 | Denuit | G06F 17/30174 707/634 |
| 2012/0089566 A1* | 4/2012 | Effern | G06F 17/30377 707/611 |
| 2012/0221528 A1 | 8/2012 | Renkes et al. | |
| 2012/0254175 A1 | 10/2012 | Horowitz et al. | |
| 2012/0303677 A1 | 11/2012 | Peh et al. | |
| 2013/0159265 A1 | 6/2013 | Peh et al. | |
| 2013/0159659 A1 | 6/2013 | Gelman et al. | |
| 2013/0166554 A1 | 6/2013 | Yoon et al. | |
| 2013/0166606 A1 | 6/2013 | Fricke et al. | |
| 2013/0311426 A1* | 11/2013 | Erdogan | G06F 17/30575 707/610 |

* cited by examiner

DATABASE TABLE RE-PARTITIONING USING TRIGGER-BASED CAPTURE AND REPLAY

TECHNICAL FIELD

The subject matter described herein relates to repartitioning of database tables using trigger-based capture and replay without the use of long-lasting exclusive locks on the database tables.

BACKGROUND

A table within a database may be partitioned. If it is partitioned, rows are allocated to partitions based on a partition specification. Such a partition specification may for example be a string like "HASH 4 col1" where "HASH" identifies the used algorithm, "4" is the number of partitions and "col1" is the column of which the values are hashed to determine the target partition for a row.

When a table is created, it may directly be created as a partitioned table. It is also possible to split a non-partitioned table into partitioned table. Partitioned tables may be re-partitioned again into a table with a different partition specification. In addition, the partitions of a table may be merged into a non-partitioned table. All of these transitions/operations can be referred to, unless otherwise specified, as "re-partitioning."

Re-partitioning means that in most cases all data has to be moved from one location (partition) to another. Such operations are comparable to copy and delete operations. In order to be compliant with backup & recovery concepts, it is also required to write redo log information which doubles the amount of data that must be written to disk.

Overall such operations are very costly from an I/O, main memory and CPU perspective. Moreover, the actual re-partitioning of a column requires that for writing, all required source pieces are available on a local server. For some cases, this can be optimized: For example a table "HASH 2 col1" has two partitions that may be located on two servers. If the table is to be re-partitioned to "HASH 4 col1", each of the servers can split the local partition locally as all required source data is present. This is different, if for example a table with "HASH 2 col1" is to be re-partitioned to "HASH 3 col1". All source partitions have to be moved to a common location where the re-partition operation can then take place. The resulting three partitions then have to be moved to respective target servers. Moving, in this regard, requires that there is a server in the landscape which is big enough to hold all data of the table as the resources (I/O, main memory and CPU) will only be utilized on that single server.

In addition to the high resource consumption and the need to move everything to a common location, there is one more aspect which is often the most critical one: While a table is re-partitioned, an exclusive lock is held on the table which prevents write operations. Only read operations are possible during re-partitioning.

Typically only big tables are subject to re-partitioning. With such data tables, the data volume is high and hence re-partitioning can often require up to one hour or longer to finalize. During normal operation of the database while the table is in use, this prolonged amount time is not acceptable for both OLTP and OLAP processing. Therefore, given such time constraints, it is highly recommended to perform re-partitioning of huge tables only during a downtime.

SUMMARY

In one aspect, partitioning of a source table of a database to a target table is initiated. Thereafter, a replay table is generated that is populated with triggers for database operations performed on the source table for subsequent replay for the target partitions. Data is later moved (e.g., asynchronously moved, etc.) from the source table to the target table. The database operations are replayed on the target table T subsequent to the moving of the data using the replay table. In addition, the source table is dropped when all of the data has been moved to the target table and there are no operations requiring replay.

The replay table can include, for example, a sequence column, all key columns of the target table and a column indicating a type of database operations. The triggers can include an insert operation that stores inserted keys in the replay table and marks them with an insert operation type indicator. The triggers can include an update operation that stores an original key in the replay table with a delete operation type indicator and that stores a new key with an insert operation type indicator. The triggers can include a delete operation that stores an original key in the replay table with a delete operation type.

The source tables can be exclusively locked while replaying the database operations using the replay table. A name of the target table can be renamed to a name of the source table upon dropping the source table.

Non-transitory computer program products (i.e., physically embodied computer program products) are also described that store instructions, which when executed on one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter enables more rapid and efficient database table partitioning.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
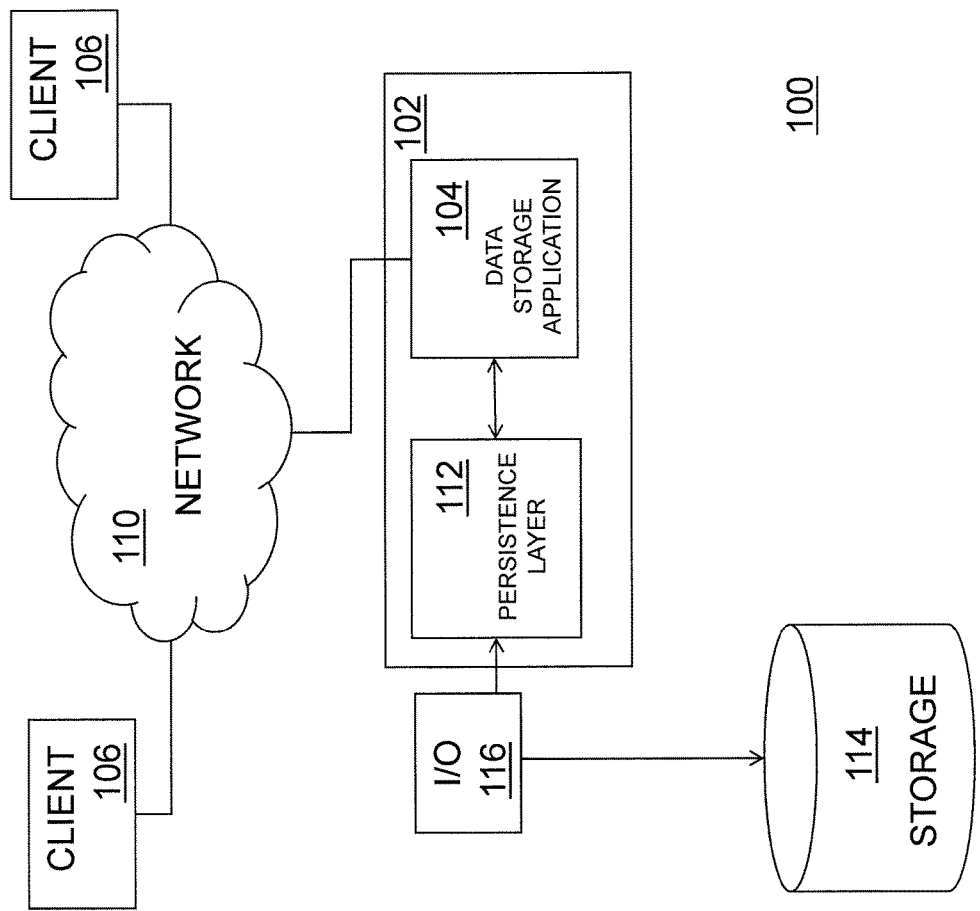
FIG. 1 is a diagram illustrating a system including a data storage application.
Figure 2:
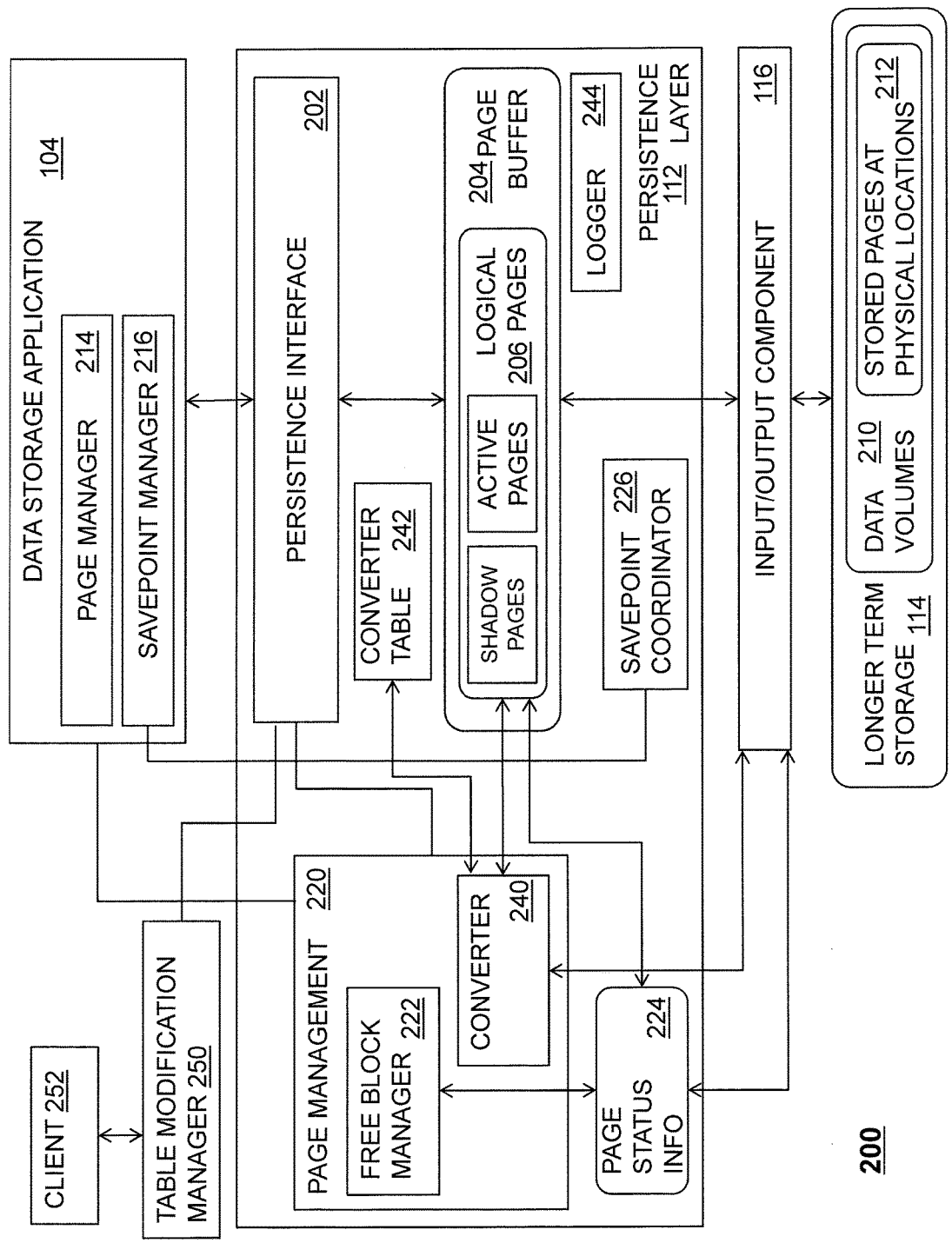
FIG. 2 is a diagram illustrating details of the system of FIG. 1.

FIGS. 1 and 2 are diagrams providing an example environment for implementing the subject matter described herein. It will be appreciated that other environments can be utilized including variations of the environments illustrated in FIGS. 1 and 2. In particular, FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

FIG. 2 shows a software architecture 200 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 202. A page buffer 204 within the persistence layer 112 can store one or more logical pages 206, and optionally can include shadow pages, active pages, and the like. The logical pages 206 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 210 where stored pages 212 are allocated at physical memory blocks.

In some implementations, the data storage application 104 can include or be otherwise in communication with a page manager 214 and/or a savepoint manager 216. The page manager 214 can communicate with a page management module 220 at the persistence layer 112 that can include a free block manager 222 that monitors page status information 224, for example the status of physical pages within the storage 114 and logical pages in the persistence layer 112 (and optionally in the page buffer 204). The savepoint manager 216 can communicate with a savepoint coordinator 226 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 222 within the page management module 220 can maintain the status of physical pages. The page buffer 204 can included a fixed page status buffer that operates as discussed herein. A converter component 240, which can be part of or in communication with the page management module 220, can be responsible for mapping between logical and physical pages written to the storage 114. The converter 240 can maintain the current mapping of logical pages to the corresponding physical pages in a converter table 242. The converter 240 can maintain a current mapping of logical pages 206 to the corresponding physical pages in one or more converter tables 242. When a logical page 206 is read from storage 114, the storage page to be loaded can be looked up from the one or more converter tables 242 using the converter 240. When a logical page is written to storage 114 the first time after a savepoint, a new free physical page is assigned to the logical page. The free block manager 222 marks the new physical page as "used" and the new mapping is stored in the one or more converter tables 242.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 244 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 244 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 202 can handle read and write requests of stores (e.g., in-memory stores, etc.). The persistence interface 202 can also provide write methods for writing data both with logging and without logging. If the logged write operations are used, the persistence interface 202 invokes the logger 244. In addition, the logger 244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 244. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 244 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 244 can write a database log (or simply referred to herein as a "log") sequentially into a memory buffer in natural order (e.g., sequential order, etc.). If several physical hard disks/storage devices are used to store log data, several log partitions can be defined. Thereafter, the logger 244 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 104 can use shadow paging so that the savepoint manager 216 can write a transactionally-consistent savepoint. With such an arrangement, a data backup comprises a copy of all data pages contained in a particular savepoint, which was done as the first step of the data backup process. The current subject matter can be also applied to other types of data page storage.

The data storage application 104 can utilize multi-version concurrent control (MVCC) for transaction isolation and consistent reading. Each row of the database can be associated with a unique, monotonically-increasing identifier (RowID). When a new version of the record is created, this new version can also become a new RowID (i.e., due to MVCC semantics, old versions must be kept for parallel readers and will be cleaned only during garbage collection after commit).

References herein to pages can refer to pages of a table stored in memory of an in-memory database forming part of the data storage application 104. With the MVCC-based database table implementation, all internal transient data objects of a table can be versioned. These data objects can include table a header object, metadata object(s), other internal state(s) such as vector of loaded pages, dictionary hashes/trees for compressed columnar tables, and the like. In addition, all table control structures used by readers can be versioned. These structures include, for example, page lists, value indirection vectors, internal metadata, and more. Readers do not acquire any locks on data structure, but rather, work with a current version of a data structure until query or query plan operator ends. With this arrangement, old versions only remain for a short period of time (e.g., sub-seconds). As versioned objects are typically small, memory overhead is also small. In addition, even with OLTP systems, incompatible changes are rare (i.e., there are not many concurrent versions, etc.). Moreover, with some implementations, if older versions of prioritized/big objects (e.g., main part of a columnar table, etc.) still exist, no new version of the corresponding object can be created. For example, if there is a reader doing a scan on the main part of a columnar table, which started during columnar table merge from version n−1 to version n, this scan uses main part in version n−1. Even after merge to version n is finished, further merge from version n to version n+1 will be prevented as long as there are any scans running on main part in version n−1 (as this might increase memory demand prohibitively).

The current subject matter is further directed to database table repartitioning techniques that create new target partitions while also allowing modifications to the source partitions while the data is moved to the target partitions in the background. Modifications that are performed on the source partitions before they are dropped and the target partitions become the only existing partitions can be recorded via triggers in a replay table. As used herein, the replay table can keep track of the rows that have been inserted, updated or deleted on the source partitions while the corresponding move operation takes place in the background. When the move is done, an exclusive table lock is acquired and the replay table is replayed so that the modifications can be applied on the target partitions.

As used herein, a trigger can be defined for a table for its insert, update and delete operations respectively. Each trigger can specify what happens when it executes. The key of the modified row can be stored in a replay table, along with a sequence number and the operation type. If multiple transactions update a row with the same key at virtually the same time, only one of these transactions can commit, the other transaction can roll back. This rollback can also roll back the rows that have been inserted into the replay table.

This means that for one key in the replay table the sequence numbers can be used to actually replay the operations.

Figure 3:
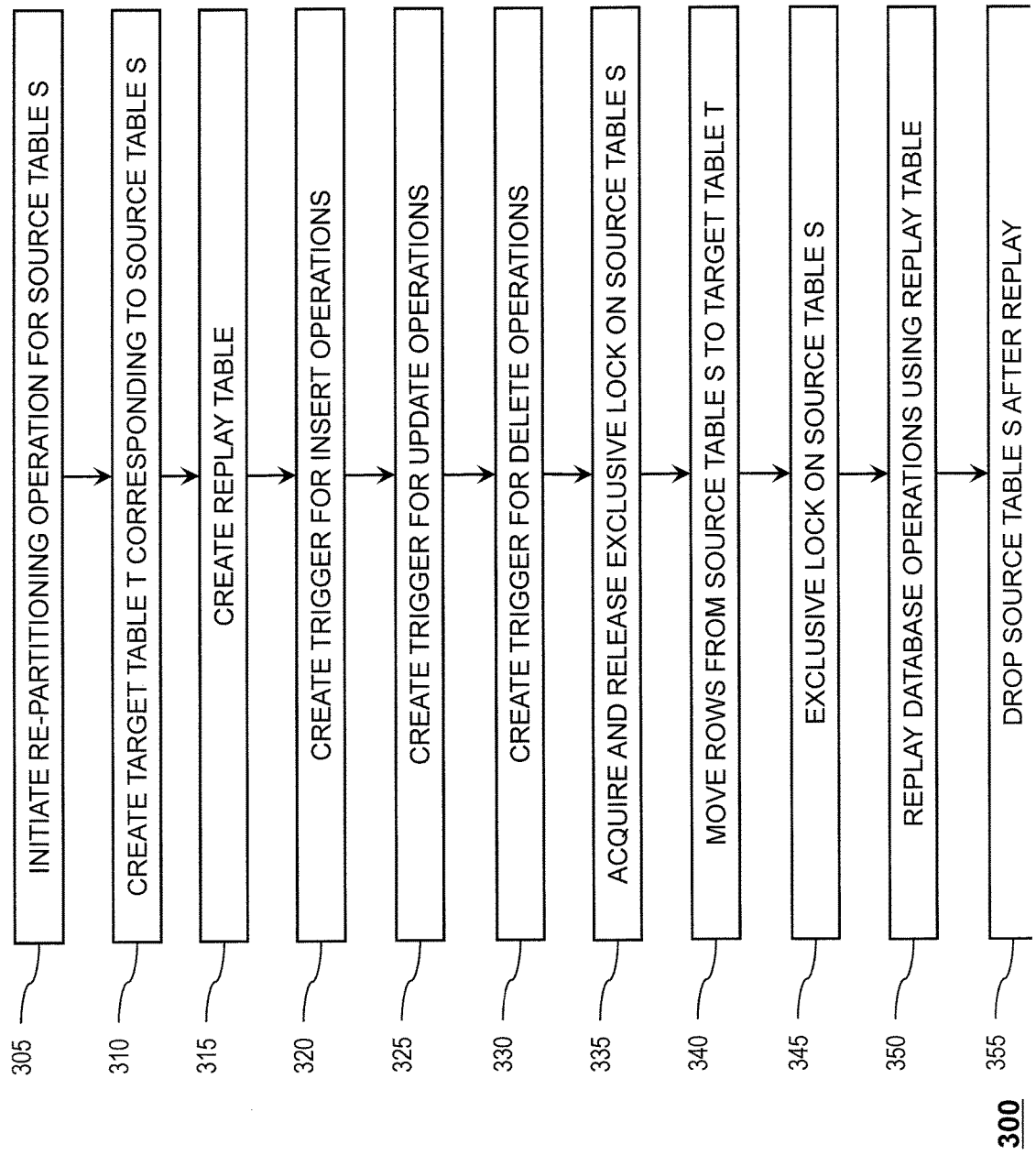
FIG. 3 is a process flow diagram illustrating asynchronous database table re-partitioning using trigger-based capture and replay.

FIG. 3 is a process flow diagram 300 in which, at 305, a client commences a repartitioning operation for a source table S. Thereafter, at 310, a new target table T can be created that has a same definition as table S but already has the target partitioning. Partitions created on the target partitions hosts can differ from the hosts where the source partitions are located. Next, at 315, a replay table can be created that includes a sequence column and a column that indicates the operation (e.g., "I" for insert, "D" for delete, etc.). A trigger for insert operations can be created, at 320, for source table S that can store inserted rows in the replay table and mark them with operation type "I". A trigger operation for update operations can be created, at 325, for source table S. Such a trigger can store the original key in the replay table and mark it with operation type "D". This trigger can store the new key (which may be identical to the old key) as operation type "I". In some variations, it can be valid to store an update operation as a single row in the replay table; provided that in order to support updates to the key, columns can be provided for both the old and the new key. In addition, at 330, a trigger for delete operations can be created for source table S that can store the key in the replay table as operation type "D".

Subsequently, at 335, an exclusive lock on source table S can be acquired and directly released again. This way it can be ensured that all other transactions are either captured by the trigger or they have already been committed and can be read by the transaction at 340. The transaction, at 340, can copy the rows via INSERT INTO with Sub-Select from source table S to target table T. With this transaction, it is important that the utilized transactional view is a view that starts after all triggers have been created. This way it is assured that new rows or modification to rows are not lost. An exclusive lock can then, at 345, be acquired on source table S. The replay table can then, at 350, be processed and all logged modifications to source table S can be replayed on target table T. Source table S can then, at 355, be dropped, and additionally, the target table T can be renamed as the source table S. The transaction that performs this switch can run in a mode in which data definition language (DDL) is not automatically committed; otherwise, read transactions might fail since they try to read data from a dropped table.

When a database client inserts a single row or bulk data into a table, a table modification manager 250 (which can be coupled to one or more clients 252) can issue an INSERT statement which is processed in an insert stack of the database. That stack ensures (in certain environments such as those illustrated in FIGS. 1-2) that the data is logged (to prevent data loss in case of crashes, to ensure recoverability etc.), the new data is written to the delta index, the new rows are referenced in the component which assures that all transactions see the correct data (i.e., multi-version concurrency control/MVCC, etc.).

With the current subject matter, an INSERT INTO with sub-select statement can be used that can start a new transaction, select data from a source partition, insert that data into a target partition (via the insert stack of the database), and commit the transaction. As used herein, such a transaction can be referred to as a data move transaction. Delta merges on target partitions can sometimes be necessary in order to keep the memory footprint at a reasonable level.

When the modifications in the replay table are processed and target table T updated, there are several noteworthy aspects. The replay table can be configured to only store the keys. By performing an inner join with source table S, it is possible to retrieve all columns. The modification to target table T can, for example, be performed with an Upsert statement. In addition, the replay can have a new transactional view that is identical to the transaction which has acquired the exclusive table lock on source table S (because the transaction has to see all current rows and values of source table S).

Still further, the creation of the triggers need not be atomic. For example it can be valid that inserts are reflected in the replay table while the delete trigger does not yet exist. When the modifications are applied, an inner join can be performed (as described above). As the row has been deleted, the row has not been copied to target table T and, additionally, the inner join produces no intermediate rows that have to be applied to target table T. On the other hand, rows which might have already been copied by the move transaction can also be logged in the replay table. To apply these rows again still results in a correct end result. In short, it is valid to have a gap between the creation of triggers and the start of the move transaction—provided that the view of the move transaction is later than the creation of all triggers.

If the move transaction takes long, the replay can also take long and hence it can sometimes be required to hold the exclusive lock for a long period of time. Therefore, the replay can be executed in several steps and the exclusive lock must be acquired only for the last and final processing round.

It will be appreciated that the replay can be implemented in a variety of ways. In one example, the replay table is sorted by key and then by sequence number. Only the row with the highest sequence number is taken into consideration. If it is has a Delete operation flag "D", a corresponding delete operation is performed for the respective key on target table T. If it is an Insert operation flag "I", an upsert operation is performed. It is possible to perform the Delete and Insert tasks with one SQL command each for all relevant rows at once.

As each statement can be executed as a single SQL statement, the database can process it entirely internally with existing functionality. Especially if the split operation is controlled by a process which does not run within the database (see below), the external process is not required to perform operations on the actual data. Therefore, no data materialization or transport to the client is required.

It has to be guaranteed by the database that the sequence number reflects the actual sequence of the SQL operations that modify source table S for a given primary key. Considering all SQL statements that are executed simultaneously on the source table S, this is not given in general—but it has to be guaranteed for a given key. In other words, if two SQL statements try to modify the same row, only one of the transactions may succeed. If one statement is automatically retried by the database (due to such a serialization issue), the trigger implementation can be called again and it can retrieve a new sequence number for the new and independent insert operation. The insert operations issued by the trigger implementation are never in conflict with each other because the replay table has the sequence number as key.

Figure 4:
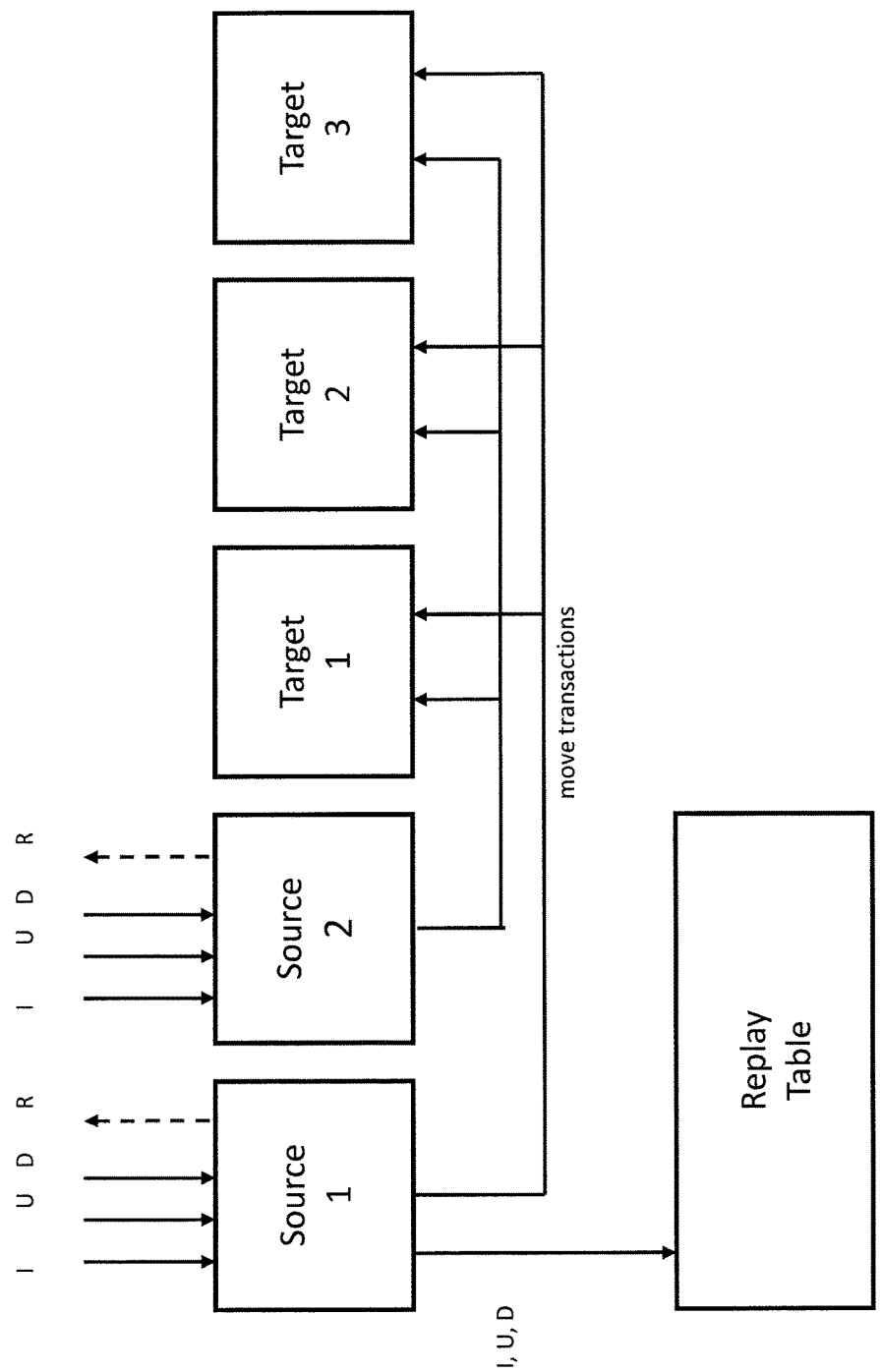
FIG. 4 is a diagram illustrating a trigger write replay table while a move transaction is in progress.
Figure 5:
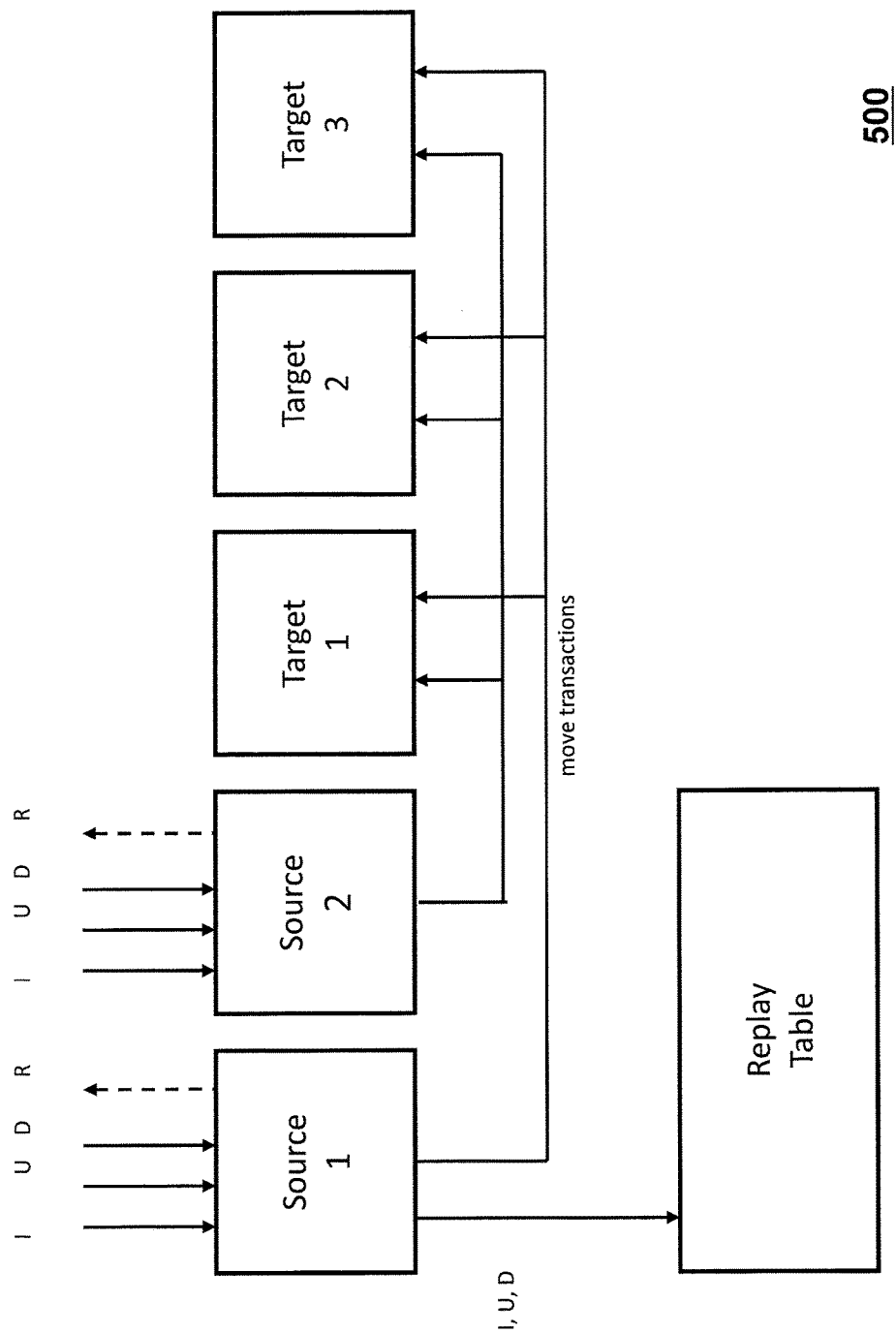
FIG. 5 is a diagram illustrating replay using a replay table while there is no exclusive lock on source partitions.
Figure 6:
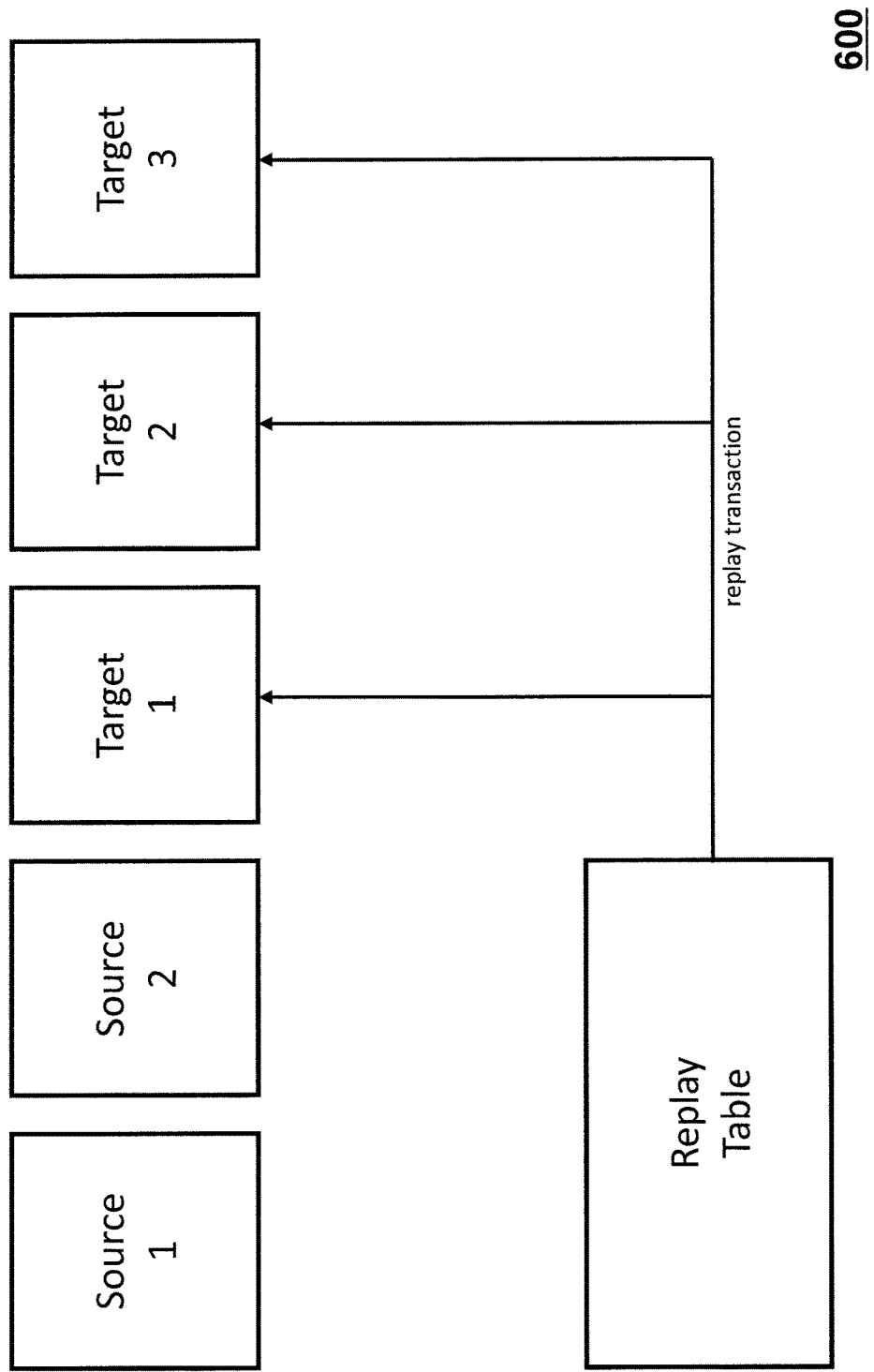
FIG. 6 is a diagram illustrating replay using a replay table while there is an exclusive lock on source partitions.

FIG. 4 is a diagram 400 that illustrates trigger write replay table while a move transaction (from the source partitions to the target partitions) is in progress. Thereafter, with reference to diagram 500 of FIG. 5, replay is illustrated using the replay table while there is no exclusive lock on the source partitions. FIG. 6 is a diagram 600 illustrating replay using a replay table while there is an exclusive lock on the source partitions.

As re-partitioning is an important database operation, such an operation can be directly implemented as part of the database itself. However, because all of the steps above can also be implemented efficiently by means of SQL, the re-partitioning operation can be implemented in a way that it executes SQL commands only. This arrangement provides loose coupling. However, one drawback can be that target table T is visible for other clients during processing.

As it is possible to execute everything via SQL, such an operation might also be shipped as a script to customers with older versions of the database. Such a script can be implemented in a way that all operations that touch lots of data keep that data and process the data entirely in the database and are not required to transfer the data to the runtime of the script infrastructure.

The concept using triggers and replay tables is used herein as a means for re-partitioning. However, it will be appreciated that the concepts described herein can be generalized for other database-internal operations that require that modifications to tables are possible for clients while for example internal re-organization takes place. One example is a move operation that moves tables or partitions to another host or an operation that transforms a column table into a row table or vice-versa.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:
    initiating a repartitioning of a source table of a database, the repartitioning comprising moving data from the source table to a target table;
    concurrently performing database operations on the source table and moving the data from the source table to the target table, the database operations modifying one or more rows in the source table;
    generating, based at least on the database operations performed on the source table, a replay table, the replay table storing, in response to triggers, one or more key values corresponding to the one or more rows in the source table that have been modified by the database operations, each of the one or more key values being associated with an insert operation or a delete operation, the replaying table comprising a key column for storing the one or more key values corresponding to the one or more rows in the source table that have been modified by the database operation, and the generation of the replay table comprising:
    responding to an update operation on a first row in the source table by storing, in the replay table, a corresponding insert operation and delete operation, the corresponding insert operation and delete operation being stored in the replay table instead of the update operation, and the storage of corresponding insert operation and delete operation comprising a first key value associated with an insert operation type indicator and a second key value associated with a delete operation type indicator, the first key value comprising the original key and/or a new key of the first row modified by the update operation, and the second key value comprising an original key of the first row modified by the update operation;

replaying, on the target table, the database operations in the replay table, the database operations in the replay table including only insert operations and/or delete operations for inserting and/or deleting the one or more rows from the target table, the replaying of the database operations being performed subsequent to the moving of the data from the source table to the target table, the replaying of the database operations comprising performing an inner join of the replay table with the source table to at least retrieve, from the source table, the one or more rows in the source table that have been modified by the database operations; and dropping the source table when all of the data has been moved to the target table and there are no more database operations requiring replay.

2. The method as in claim 1, wherein the generation of the replay table further comprises responding to an insert operation by storing, in the replay table, a third key value associated with the insert operation type indicator, and wherein the third key value is associated with a second row that is inserted into the source table by the insert operation.

3. The method as in claim 1, wherein the generation of the replay table further comprises responding to a delete operation by storing, in the replay table, a third key value associated with the delete operation type indicator, and wherein the third key value is associated with a second row that is deleted from the source table by the delete operation.

4. The method as in claim 1, further comprising: exclusively locking the source tables while replaying the database operations using the replay table.

5. The method as in claim 1, further comprising:
renaming a name of the target table to a name of the source table upon dropping the source table.

6. A non-transitory computer program product storing instructions which, when executed by at least one data processor forming part of at least one computing system, results in operations comprising:
initiating a repartitioning of a source table of a database, the repartitioning comprising moving data from the source table to a target table;
concurrently performing database operations on the source table and moving the data from the source table to the target table, the database operations modifying one or more rows in the source table;
generating, based at least on the database operations performed on the source table, a replay table, the replay table storing, in response to triggers, one or more key values corresponding to the one or more rows in the source table that have been modified by the database operations, each of the one or more key values being associated with an insert operation or a delete operation, the replaying table comprising a key column for storing the one or more key values corresponding to the one or more rows in the source table that have been modified by the database operation, and the generation of the replay table comprising:
responding to an update operation on a first row in the source table by storing, in the replay table, a corresponding insert operation and delete operation, the corresponding insert operation and delete operation being stored in the replay table instead of the update operation, and the storage of corresponding insert operation and delete operation comprising a first key value associated with an insert operation type indicator and a second key value associated with a delete operation type indicator, the first key value comprising the original key and/or a new key of the first row modified by the update operation, and the second key value comprising an original key of the first row modified by the update operation;

replaying, on the target table, the database operations in the replay table, the database operations in the replay table including only insert operations and/or delete operations for inserting and/or deleting the one or more rows from the target table, the replaying of the database operations being performed subsequent to the moving of the data from the source table to the target table, the replaying of the database operations comprising performing an inner join of the replay table with the source table to at least retrieve, from the source table, the one or more rows in the source table that have been modified by the database operations; and dropping the source table when all of the data has been moved to the target table and there are no more database operations requiring replay.

7. The computer program product as in claim 6, wherein the generation of the replay table further comprises responding to an insert operation by storing, in the replay table, a third key value associated with the insert operation type indicator, and wherein the third key value is associated with a second row that is inserted into the source table by the insert operation.

8. The computer program product as in claim 6, wherein the generation of the replay table further comprises responding to a delete operation by storing, in the replay table, a third key value associated with the delete operation type indicator, and wherein the third key value is associated with a second row that is deleted from the source table by the delete operation.

9. The computer program product as in claim 6, wherein the operations further comprise:
exclusively locking the source tables while replaying the database operations using the replay table.

10. The computer program product as in claim 6, wherein the operations further comprise:
renaming a name of the target table to a name of the source table upon dropping the source table.

11. A system comprising:
at least one data processor; and
memory storing instructions which, when executed by the at least one data processor, results in operations comprising:
initiating a repartitioning of a source table of a database, the repartitioning comprising moving data from the source table to a target table;
concurrently performing database operations on the source table and moving the data from the source table to the target table, the database operations modifying one or more rows in the source table;
generating, based at least on the database operations performed on the source table, a replay table, the replay table storing, in response to triggers, one or more key values corresponding to the one or more rows in the source table that have been modified by the database operations, each of the one or more key values being associated with an insert operation or a delete operation, the replaying table comprising a key column for storing the one or more key values corresponding to the one or more rows in the source table that have been modified by the database operation, and the generation of the replay table comprising:

responding to an update operation on a first row in the source table by storing, in the replay table, a corresponding insert operation and delete operation, the corresponding insert operation and delete operation being stored in the replay table instead of the update operation, and the storage of corresponding insert operation and delete operation comprising a first key value associated with an insert operation type indicator and a second key value associated with a delete operation type indicator, the first key value comprising the original key and/or a new key of the first row modified by the update operation, and the second key value comprising an original key of the first row modified by the update operation;

replaying, on the target table, the database operations in the replay table, the database operations in the replay table including only insert operations and/or delete operations for inserting and/or deleting the one or more rows from the target table, the replaying of the database operations being performed subsequent to the moving of the data from the source table to the target table, the replaying of the database operations comprising performing an inner join of the replay table with the source table to at least retrieve, from the source table, the one or more rows in the source table that have been modified by the database operations; and dropping the source table when all of the data has been moved to the target table and there are no more database operations requiring replay.

12. The system as in claim 11, wherein the generation of the replay table further comprises responding to an insert operation by storing, in the replay table, a third key value associated with the insert operation type indicator, and wherein the third key value is associated with a second row that is inserted into the source table by the insert operation.

13. The system as in claim 11, wherein the generation of the replay table further comprises responding to a delete operation by storing, in the replay table, a third key value associated with the delete operation type indicator, and wherein the third key value is associated with a second row that is deleted from the source table by the delete operation.

14. The system as in claim 11, wherein the operations further comprise:
exclusively locking the source tables while replaying the database operations using the replay table; and
renaming a name of the target table to a name of the source table upon dropping the source table.

* * * * *